(12) United States Patent
Shi (10) Patent No.: US 7,679,607 B2
(45) Date of Patent: Mar. 16, 2010

(54) ELECTRONIC WHITEBOARD HAVING ELECTROMAGNETIC SENSING LAYER OF CONDUCTOR GRID

(75) Inventor: Xuanming Shi, Chungli (CN)

(73) Assignee: Tai Guen Enterprises Co., Ltd., Taoyuan Hsien (TW)

( * ) Notice: Subject to any disclaimer, the term of this patent is extended or adjusted under 35 U.S.C. 154(b) by 969 days.

(21) Appl. No.: 10/527,849

(22) PCT Filed: Sep. 27, 2002

(86) PCT No.: PCT/CN02/00690

§ 371 (c)(1),
(2), (4) Date: Mar. 15, 2005

(87) PCT Pub. No.: WO2004/027698

PCT Pub. Date: Apr. 1, 2004

(65) Prior Publication Data

US 2006/0101682 A1     May 18, 2006

(30) Foreign Application Priority Data

Sep. 17, 2002 (CN) .................. 02 1 30934

(51) Int. Cl.
*G06F 3/046* (2006.01)
*G06F 3/041* (2006.01)
(52) U.S. Cl. .................. 345/173; 178/18.07
(58) Field of Classification Search ......... 345/173–180; 178/18.01–20.04
See application file for complete search history.

(56) References Cited

U.S. PATENT DOCUMENTS

| | | | | |
|---|---|---|---|---|
| 4,678,870 A | * | 7/1987 | Taguchi et al. | 178/18.07 |
| 4,878,553 A | * | 11/1989 | Yamanami et al. | 178/18.07 |
| 5,450,348 A | * | 9/1995 | Roemersma | 701/99 |
| 5,506,375 A | * | 4/1996 | Kikuchi | 178/18.07 |
| 6,489,899 B1 | * | 12/2002 | Ely et al. | 341/20 |
| 7,486,270 B2 | * | 2/2009 | Shih | 345/156 |
| 2002/0044208 A1 | * | 4/2002 | Yamazaki et al. | 348/272 |
| 2002/0063694 A1 | * | 5/2002 | Keely et al. | 345/173 |

FOREIGN PATENT DOCUMENTS

JP    888709    2/1996
JP    865430    3/1996

\* cited by examiner

*Primary Examiner*—Bipin Shalwala
*Assistant Examiner*—Steven E Holton (57) ABSTRACT

An electronic white board with a built-in electromagnetic induction layer of wire lattice comprises: a writing input portion, a covering frame portion formed around the periphery of the electronic white board, and a control circuit. The writing input portion has multiple layers and is enclosed in the frame, and includes a surface writing layer, an underlayer, and an input induction layer which is formed between the surface writing layer and the underlayer, and is connected to the control circuit by its output. The input induction layer is a wire lattice winded and interlaced separately by wires along the X and Y axes, and the wires are insulated with each other at the crossing points. The area enclosed within each lattice unit constitutes one induction cell. The present invention possesses the following advantages: simple and reasonable structure; easy manufacturing; highly reduced cost of the electronic whiteboard; convenient for maintenance; highly improved induction accuracy; portable and convenient for carrying, hanging, storing and space saving.

14 Claims, 6 Drawing Sheets

ELECTRONIC WHITEBOARD HAVING ELECTROMAGNETIC SENSING LAYER OF CONDUCTOR GRID

FIELD OF THE INVENTION

The present invention relates to an electronic whiteboard, particularly to an electronic whiteboard with a built-in electromagnetic induction layer of wire lattice with low cost, easy manufacturing and high identification precision. The present invention belongs to the field of electronic technology.

BACKGROUND OF THE INVENTION

Whiteboard is often used in work and life to make record or discussion. For example, in teaching and meeting, words, symbols and so on can be written on the whiteboard and can also be erased conveniently. However, the content written on the traditional whiteboard appears only once; it can't be stored and reproduced. Therefore, it is hard for the traditional whiteboard to satisfy the increasing application requirements of current digitized life and work.

Along with the development of electronic technology, an electronic whiteboard is used for teaching in school and for studying and discussing in a department. Such product can promptly convert the symbols written on the whiteboard into electronic signals, and transfers the electronic signals to a connected computer, then directly accomplishes editing or remote information commutation of printing, transmission, etc. via the computer. For the existing electronic whiteboard, due to its large induction area, it is impossible to manufacture, for example, etching and manufacturing the electromagnetic induction type of the printed circuit board, or the resistance-induction type frames like touch screens cannot be adopted as the induction frame because of high cost. Therefore, the ultrasonic wave transmission and reception between an input pen and an electronic whiteboard is widely used in electronic whiteboard controlling and operation. But the application of such products is limited due to the high cost and low accuracy.

In conclusion, the existing products have many disadvantages, such as: very low identification ratio, poor accuracy, high cost, and difficulty in manufacture, which limit wide application of such products.

SUMMARY OF THE INVENTION

The object of the present invention is to overcome the disadvantages of the prior art, and to provide an electronic whiteboard with a built-in electromagnetic induction layer of wire lattice with low cost, simple manufacturing, and high accuracy of data acquisition and identification.

Another object of the present invention is to provide an electronic whiteboard with a built-in electromagnetic induction layer of wire lattice, which has long operating life and easy maintenance.

A further object of the present invention is to provide an electronic whiteboard with a built-in electromagnetic induction layer of wire lattice, which is portable and convenient for use.

The objects of the present invention are achieved by the following technical solutions:

An electronic whiteboard with a built-in electromagnetic induction layer of wire lattice includes: a writing input portion, a covering frame portion formed around the periphery of the writing input portion, and a control circuit; wherein the writing input portion has multiple layers and is enclosed in the frame; the writing input portion includes a surface writing layer, an underlayer and an input induction layer which is formed between the surface writing layer and the underlayer, and is connected to the control circuit by its output, characterized in that the induction layer is a wire lattice winded and interlaced separately by wires along the X and Y axes, the wires are insulated with each other at the crossing points, and a space formed within each lattice unit constitutes one induction cell.

The area of said induction layer is the same as or smaller than those of the writing layer and the underlayer, i.e., the induction layer is entirely or partially sandwiched between the writing layer and the underlayer.

A shielding layer is provided behind the induction layer in order to enhance the anti-interference ability of the device.

Furthermore, a buffering layer is provided between the induction layer and the underlayer, or between the induction layer and the shielding layer.

For the induction layer formed by a wire lattice winded and interlaced separately by wires along the X and Y axes, the wires can be covered or coated by an insulating layer on the surface. Alternatively, enameled wires can be adopted directly as the wires.

More than one induction layer are overlaid together, and the induction cells on each induction layer are interlaced one another at the same or different intervals. In other words, the size of an induction cell on one induction layer may be the same as or different from the size of an induction cell on another induction layer.

In order to position the winded wire lattice reliably, the wire lattice can be attached and fixed on the insulating membrane by thermal pressing or thermal melting so as to form the wire electromagnetic induction layer with an insulating membrane. The insulating membrane is made of film material so as to lower the cost.

In order to improve the precision of the electrical whiteboard, more than one induction layer are overlaid together, and the induction cells on each induction layer are interlaced one another with the same or different intervals.

When the writing area of the electronic whiteboard is large, the area of the induction layer should be enlarged correspondingly, and the wire electromagnetic induction layer with the insulating membrane may be made up of multiple pieces of the wire electromagnetic induction layer assembled together. A wire eduction electrical connection means along the X or Y axis is provided on each piece of wire lattice electromagnetic induction layer, and each piece of wire lattice electromagnetic induction layer is connected by the wire eduction electrical connection means.

The connection means is a pin-type connection means or a flexible printed wiring means, or a PIN-PIN connection means, or a welding spot (VGA) thermal-melting connection means, or an ultrasonic welding device, or a solder-plate welding device, or a puncturing connection means.

The control circuit includes circuits for signal amplification, filtering acquisition and data processing, and is provided with a signal output control circuit and/or a storing device.

The signal output device comprises electrical cable with standard computer data interface or wireless data switching means, i.e. radio frequency transceiver.

The signal output device connects with a computer and/or a printer, or an external data storing device, or connects with a telephone line by an auxiliary modem.

The control circuit and the induction layer are directly connected in a whole, components of the control circuit are positioned on the output end of the wire lattice, and the control circuit is formed in the body of the electronic whiteboard.

The components of the control circuit are provided on a printed wiring board which is separated from the induction layer; the output end of the wire lattice of the induction layer is connected to the corresponding input terminal on the printed circuit board by means of pressure-connection, plug-in connection or welding connection.

The output end of the wire lattice of the induction layer is formed between a hard pressing strip and the printed circuit board; a buffering layer is provided between the hard pressing strip and the output end of the wire lattice; and the hard pressing strip, the buffering layer and the output end of the wire lattice are overlaid on the printed circuit board by means of the screwing-conjunction; the output end of the wire lattice is connected to the corresponding input terminal on the printed circuit board.

The control circuit is integrated with the body of the electronic whiteboard, and is positioned in the covering frame that is around the periphery of the body.

The control circuit may also be installed outside the body, and connected to the body through the electrical connection means, the output of the wire lattice of the induction layer is connected with the output interface of the induction layer by means of pressure-connection, plug-in connection or welding-connection, and an interface matching the electrical connection means of the induction layer is provided on the control circuit.

The output end of the wire lattice of the induction layer is formed between the hard pressing strip and the electrical connection means; the buffering layer is provided between the hard pressing strip and the output end of the wire lattice; the hard pressing strip, the buffering layer and the output end of the wire lattice are overlaid on the electrical connection means by means of the screwing-conjunction; the output end of the wire lattice is connected to the corresponding input terminal on the electrical connection means.

The output interface of the induction layer and the interface of the control circuit are a pin-type connection means, or a flexible printed wiring means, or a PIN-PIN connection means, or a welding spot (VGA) thermal-melted connection means, or an ultrasonic welding device, or a solder-plate welding device, or a puncturing connection means.

A bracket is installed outside the frame of the body, and the body is supported by the bracket.

The control circuit may be installed in the bracket, the interface electrically connecting with the induction layer is set on the bracket, and the output interface of the induction layer is set at a place in the body corresponding to the interface of the control circuit.

For convenient carrying and hanging, the writing input portion and the covering frame around the writing input portion is made of flexible and windable material, and the body of the electronic whiteboard is windable and portable material.

One side of the body is fixed in a spool in which wring-springs for winding up the body are mounted on both ends, and another side of the body is provided with a positioning fastener. The control circuit may be installed in the spool.

Referring to the above-mentioned technical solutions, it is known that the present invention possesses the following advantages: simple and reasonable structure; easy manufacturing; highly reduced cost of the electronic whiteboard; convenient for maintenance; highly improved induction accuracy and can be expanded widely. The electronic whiteboard according to the invention has resolved the problem of the conventional whiteboard, and creates an application mode of communication by using the convenience of the electronic whiteboard.

DETAILED DESCRIPTION OF THE PREFERRED EMBODIMENTS

The present invention will be explained in detail with reference to the drawings and embodiments.

Embodiment 1

Figure 1:
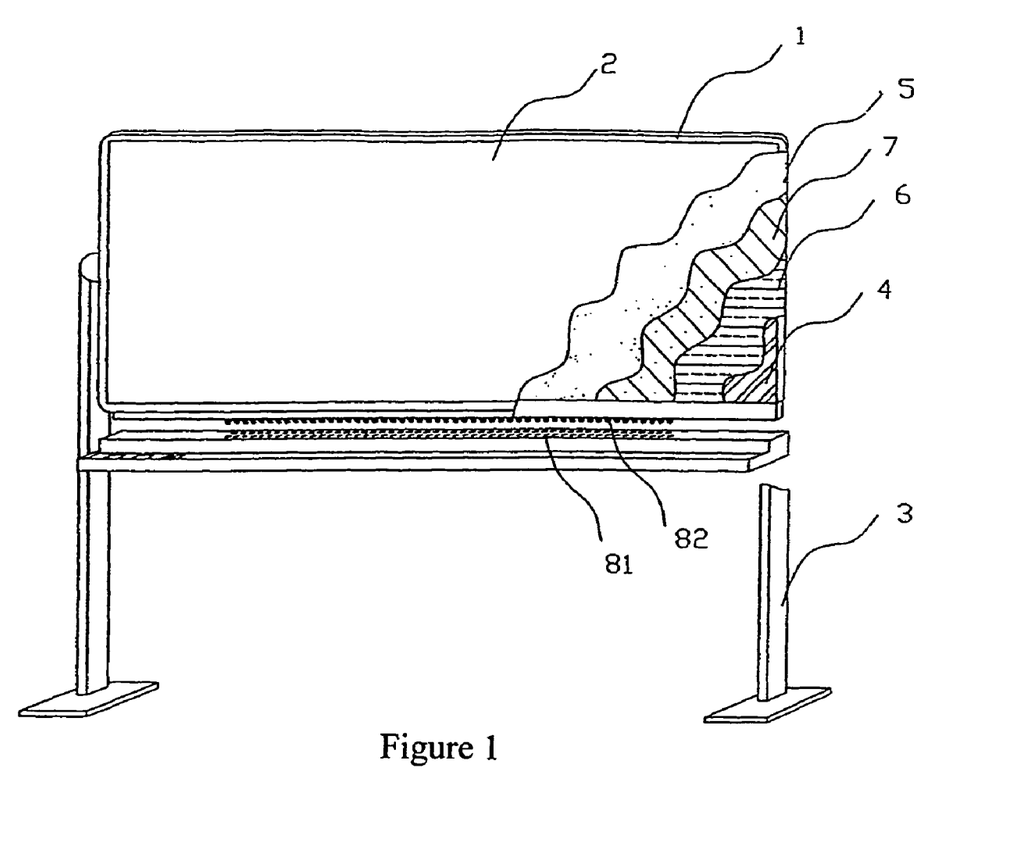
FIG. 1 is a diagram showing the spatial structure of embodiment one according to the present invention.

As shown in FIG. 1, an electronic whiteboard with a built-in electromagnetic induction layer of wire lattice according to the invention includes: a writing input portion, a covering frame formed around the periphery of the electronic whiteboard, and a control circuit; wherein the writing input portion has multiple layers and is enclosed in frame 1. The writing input portion includes a surface writing layer 2, an underlayer 4, and an input induction layer which is provided between the writing layer 2 and the underlayer 4, and is connected to the control circuit by its output.

The area of the induction layer 5 is the same as or smaller than that of the writing layer 2 and the underlayer 4, and therefore the induction layer 5 is entirely or partially sandwiched between the writing layer 2 and the underlayer 4. The induction layer 5 is positioned at one side or in the center of the writing area of the writing input portion.

As shown in FIG. 1, a shielding layer 6 is provided behind the induction layer 5 in order to enhance the anti-interference ability of the device, the shielding layer 6 can efficiently overcome the electromagnetic interference to the control circuit from the induction layer 5.

A buffering layer 7 is provided between the induction layer 5 and the underlayer 4, or between the induction layer 5 and the shielding layer 6. The buffering layer 7 is used to keep a reasonable space among the induction layer, the writing surface and the shielding layer 6. Furthermore, electromagnetic signals can be transmitted from the pen either when the pen is pressed down or when the pen is not pressed down for convenient control. Certainly, the pen can be designed into no signal without pressure. Furthermore, the pen can induce the pressure by using different frequency.

As shown in FIGS. 2, 3, 4 and 5, the induction layer 5 is a wire lattice interlaced by the wires 52 winded along the X axis and the wires 51 winded along the Y axis, and the wires are insulated with each other at the crossing point 54. The area enclosed by each lattice unit constitutes one induction cell 53. Positioning columns 511 can be provided around the induction layer while winding. The wires are entirely covered or coated by an insulating layer on the surface. For example, the wire lattice can be winded by the enameled wires along X and Y axes.

Figure 5:
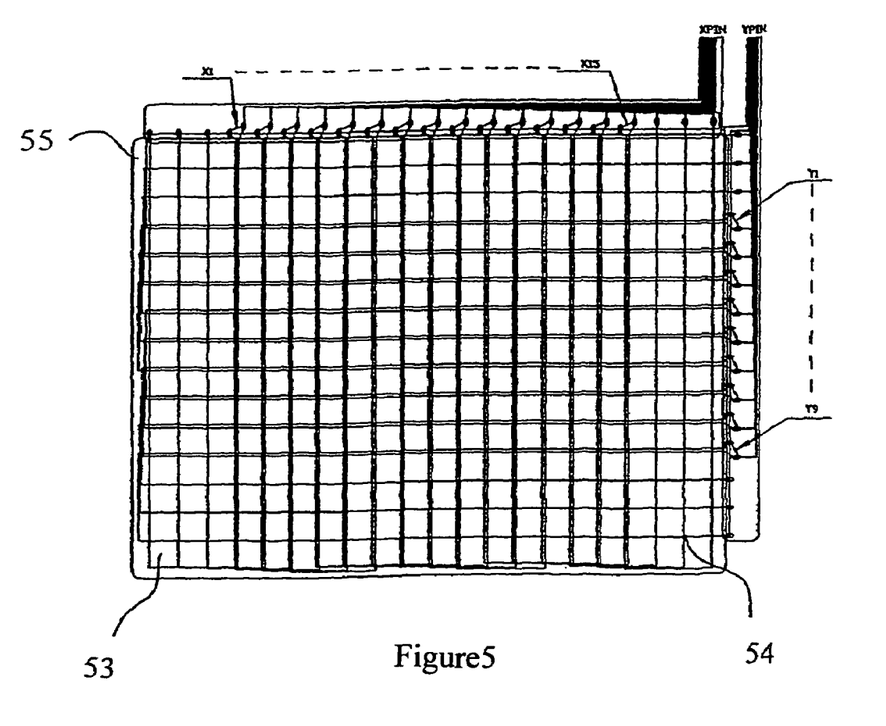
FIG. 5 is a diagram showing the whole structure of the induction cells formed by the wire lattice winded by the wires according to the present invention.

In order to position the winded wire lattice reliably, and easy for the following maintenance, the wire lattice can be attached and fixed on the insulating membrane 55 by thermal pressing or thermal melting so as to form the wire lattice electromagnetic induction layer 5 with an insulating membrane 55. The insulating membrane is made of film material.

Figure 7:
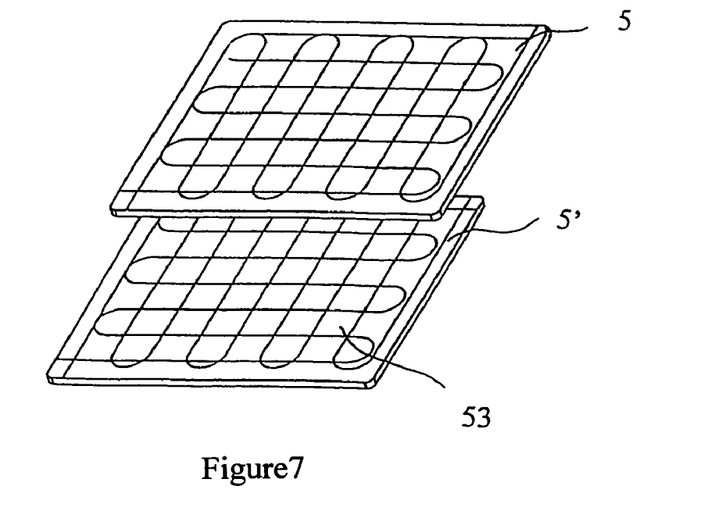
FIG. 7 is a structural diagram showing two overlaid induction layers according to the present invention.

As shown in FIG. 7, multiple induction layers 5 and 5' are overlaid together and the induction cells 53 on respective induction layers are interlaced with each other so as to improve the accuracy of the electronic whiteboard. The intervals of the induction cells 53 on respective layers can be in the same or different sizes. After the induction layers whose induction cells 53 are in different intervals are overlaid together, the scale unit of the coordinates is consequentially shorten, so that the accuracy of induction is improved. In the case that the induction layers whose induction cells 53 are in the same size are overlaid together, the scale unit of the coordinates is also shorten due to the interlaced location of the induction cells, so as to enhance the precision of the electronic whiteboard.

Figure 6:
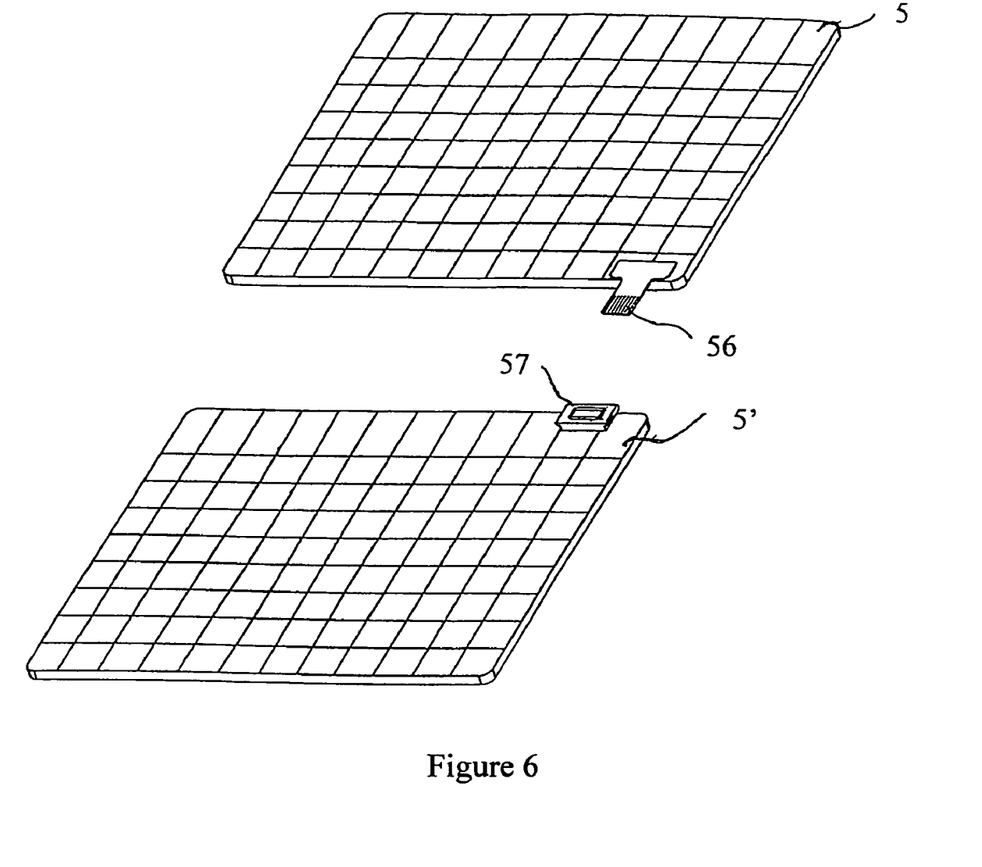
FIG. 6 is a diagram showing the structure of the induction layer made up of more than one piece and the interface of the electrical connection.

As shown in FIG. 6, if the writing area of the electronic whiteboard is large, the area of the induction layer should be enlarged correspondingly, and the large electromagnetic induction layer can be assembled by multiple wire electromagnetic induction layers 5 and 5' with membranes, wherein wire eduction electrical connection means 56 and 57 along the X and Y axes are provided on each piece of the wire lattice electromagnetic induction layer, and each piece of the wire lattice electromagnetic induction layer is connected by means of the wire eduction electrical connection means. In the present invention, as illustrated in FIG. 7, each wire winded along the Y axis is winded with multiple turns to form a number of loops with a plurality of latitudes substantially uniformly distributed across the entire wire lattice and each wire winded along the X axis is also winded with multiple turns to form a number of loops with a plurality of longitudes substantially uniformly distributed across the entire wire lattice.

The connection means 56 and 57 may be one of the following: a pin-type connection means, a flexible printed circuit means, a PIN-PIN connection means, a welding spot (VGA) thermal-melted connection means, an ultrasonic welding device, a solder-plate welding device, or a puncturing connection means.

The signal output device of the electronic whiteboard is the cable connection means or wireless data switching means. Particularly, the cable connection means may be an electrical cable with an USB interface; the wireless data switching means may be an RF transceiver. With above configuration, local storage or remote transmission can be performed, or an Internet access means can be connected immediately, so as to pack the input contents as data packets and then transmit the data packets. Certainly, the signal output device is connected to a computer and/or a printer so that a user can immediately edit and/or print the induction-collected information on the whiteboard. Furthermore, the signal output device is connected directly to a data storage device, so as to store the data and then transfer the data into a computer or other facilities via a portable memory device. The specific circuit configuration and connection mode between the signal output device and the peripheral are similar to those in other consumer electronic products, and hence the unnecessary details will not be described.

According to the present invention, the control circuit is connected to the output end of the wire lattice in a whole, and the control circuit is positioned in the body.

Figure 2:
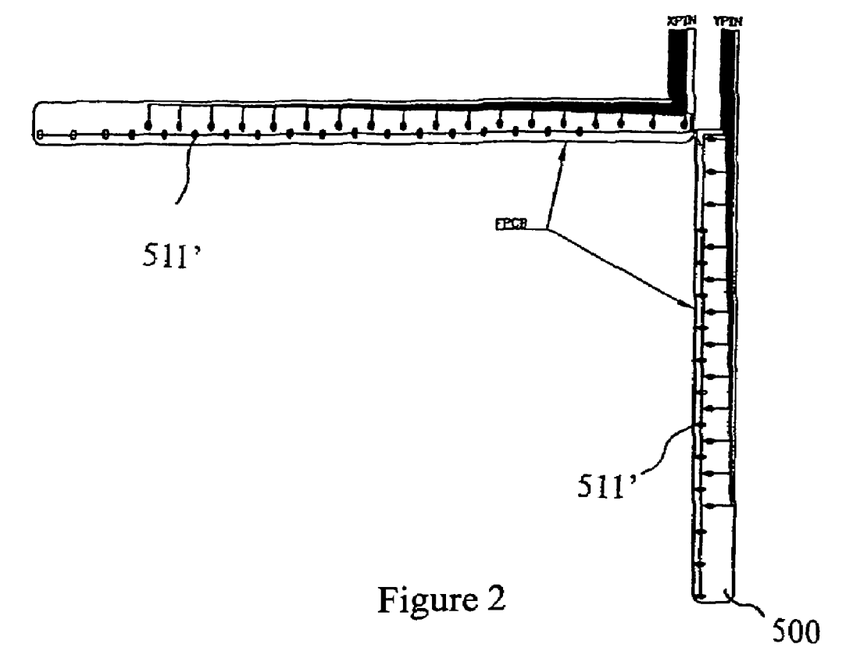
FIG. 2 is a structural diagram showing the corresponding input terminal on the printed circuit board according to the present invention.
Figure 3:
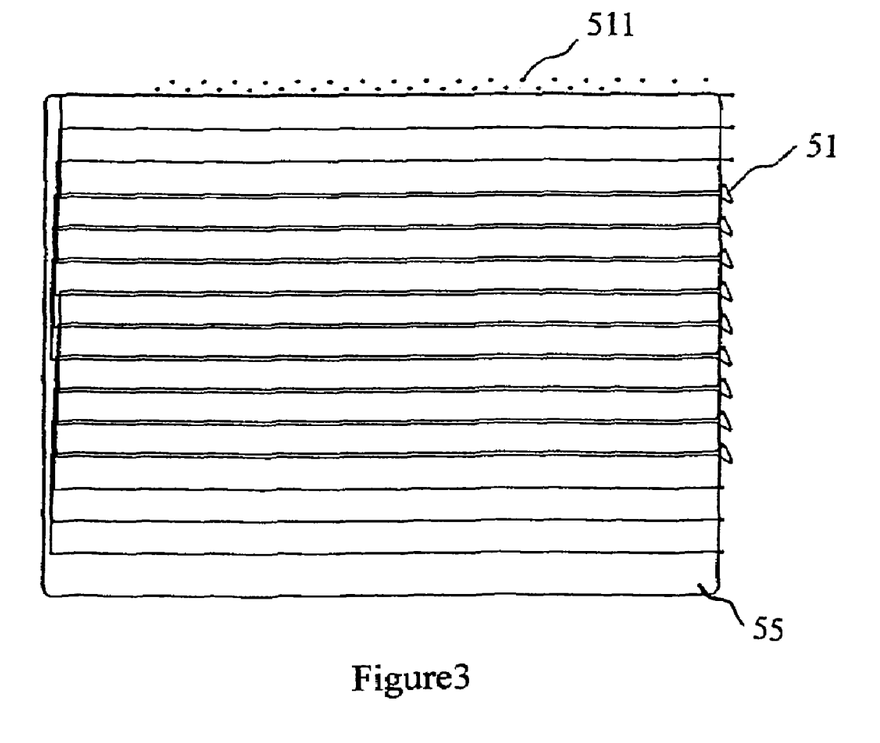
FIG. 3 is a structural diagram showing the wires of the induction layer winded along Y axis according to the present invention.
Figure 4:
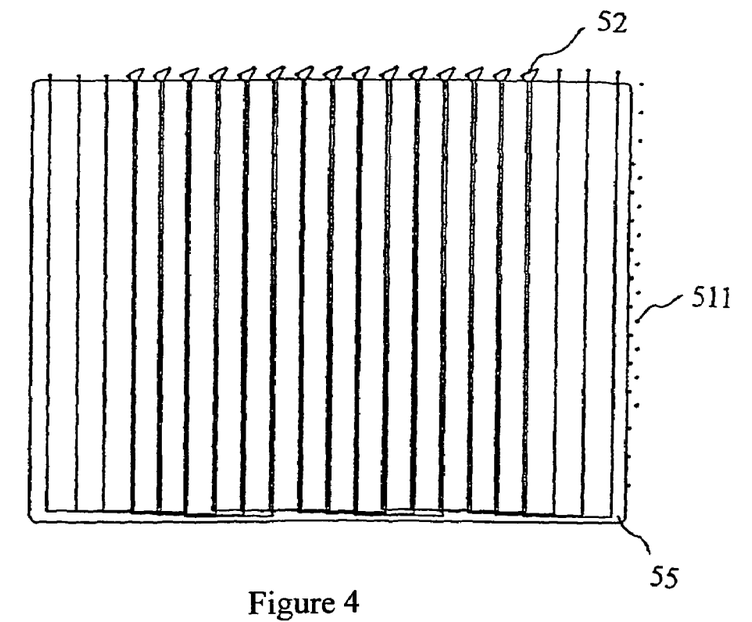
FIG. 4 is a structural diagram showing the wires of the induction layer winded along X axis according to the present invention.

The control circuit is provided on a printed circuit board which is separated from the induction layer 5; the output end of the wire lattice of the induction layer 5 is connected to the corresponding input terminal 511' on the printed circuit board by means of pressure-connection, plug-in connection or welding connection, as shown in FIGS. 2 and 5.

Figure 10:
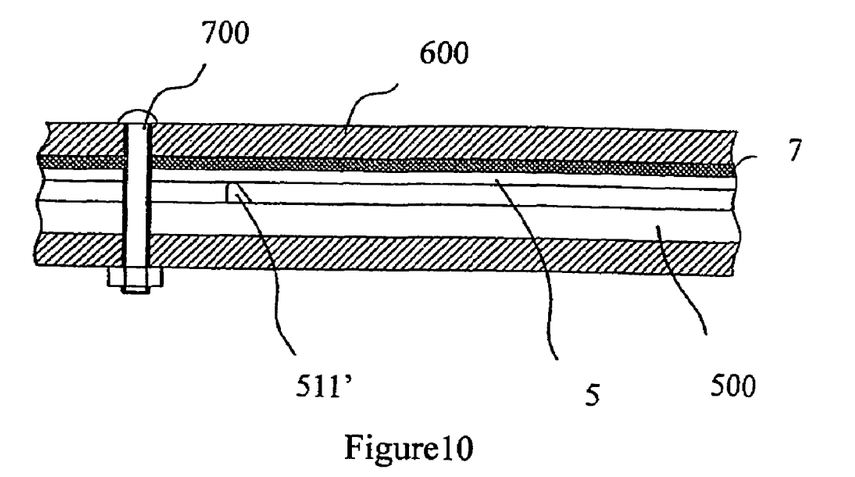
FIG. 10 is a structural diagram showing the connection relationship between the output end of the wire lattice and the corresponding input terminal of the printed circuit board according to the present invention.

As shown in FIG. 10, the output of the wire lattice of the induction layer 5 is positioned between a hard pressing strip 600 and a printed circuit board 500. A buffering layer 7 is positioned between the hard pressing strip 600 and the output end of the wire lattice. The hard pressing strip 600, the buffering layer 7 and the output end of the wire lattice are overlaid on the printed circuit board 500 by means of the screwing-conjunction 700. The output end of the wire lattice is connected with the corresponding input terminal 511' on the printed circuit board 500.

When the control circuit of the whiteboard is integrated with the body, it can be positioned in the covering frame that is around the periphery of the body.

Figure 8:
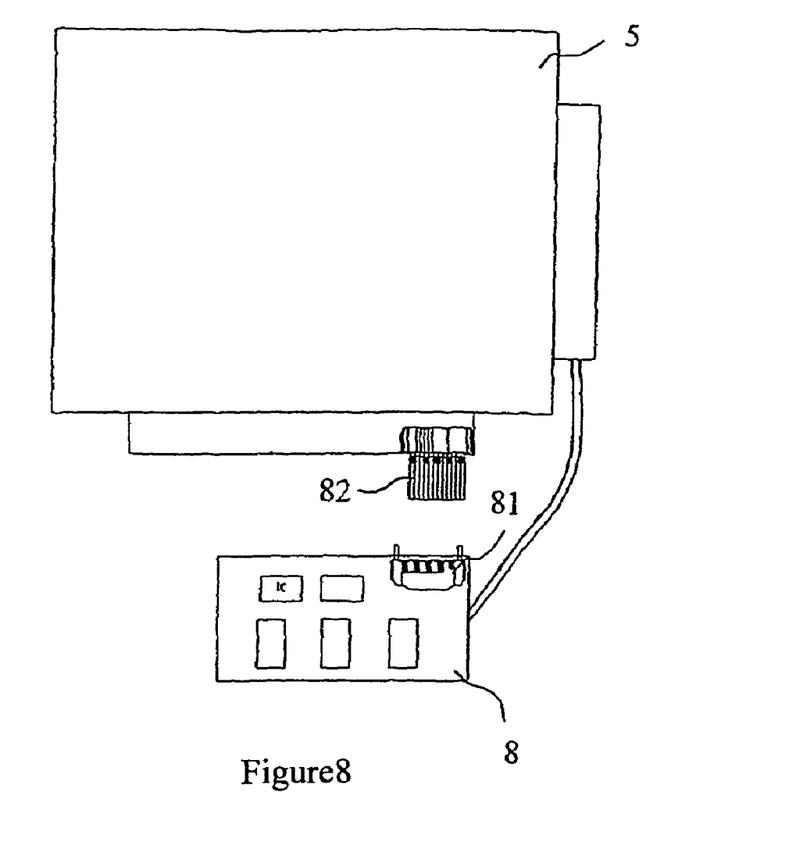
FIG. 8 is a structural diagram showing the connection relationship between the induction layer and the control circuit which are formed separately according to the present invention.

Furthermore, as shown in FIG. 8, the control circuit 8 according to the invention can be positioned outside the body, and connected to the body through the electrical connection means. The output of the wire lattice of the induction layer 5 is connected with the output interface 82 of the induction layer 5 by means of pressure-connection, plug-in connection or welding-connection. The connection can be achieved with existing usual standard interfaces, for example, the output interface 82 of the induction layer and the interface 81 of the control circuit can be one of the following connection types respectively: pin-type connection means, flexible printed circuit means, PIN-PIN connection means, welding spot (VGA) thermal-melted connection means, ultrasonic welding device, solder-plate welding device, puncture-type connection means.

In the case that the control circuit is separated from the body, it is convenient to upgrade the electronic whiteboard at any time and easy for maintenance and repairing.

As shown in FIG. 1, a bracket 3 is provided outside the body frame 1, and the body 1 is mounted on the bracket 3. The control circuit 8 is positioned in the bracket 3, the interface is set on the bracket 3, and the output interface 82 of the induction layer is set at a place in the body corresponding to the interface 81 of the control circuit.

Figure 9:
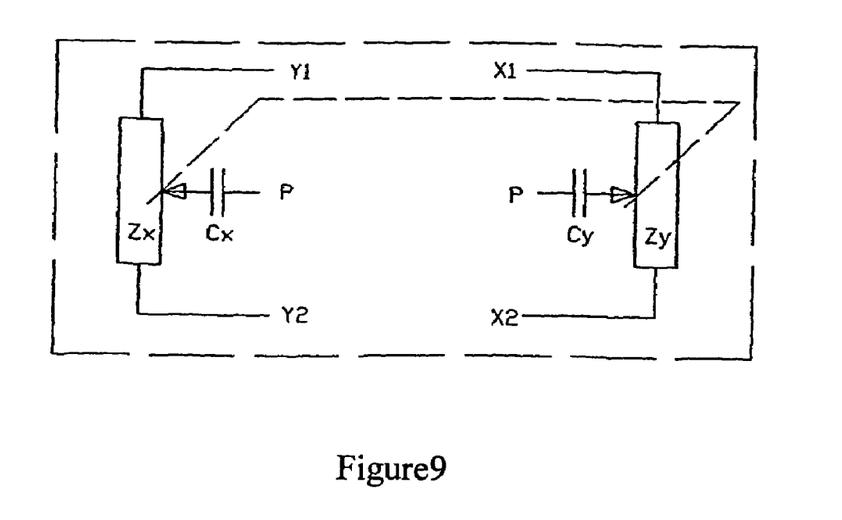
FIG. 9 is a diagram showing the principle of generating the induction signal and identifying the location of the input pen.

The operation mechanism of the present invention is as shown in FIG. 9. In FIG. 9, P is the signal input terminal of the pen, and there is a bigger conductor on the head of the pen. When the pen is close to the induction cell, the pen-point constitutes an electrode of the electric field, and the conductive medium on the induction layer constitutes another electrode. The electric fields of the pen along X and Y axes are indicated by Cx and Cy. Y1 and Y2 in the figure denote the eduction PINs along the Y axis, X1 and X2 denote the eduction PINs along the X axis. There is a line Zx along X axis, which strings all lines in the X axial direction together and is equivalent to a resistance Zx, and there is a line Zy along Y axis, which strings all lines in the Y axial direction together and is equivalent to a resistance Zy. When the pen shakes above the antenna, the alternative electric potential on the pen-point couples to the X and Y axial antenna groups via resistances Zx and Zy, and because the two groups of antennas are formed by a plurality of lines, the line closer to the pen-point will receive a stronger alternative electric potential. The vector of the electric potential received by these lines is indicated by the position of the above slip resistance arrow between the resistances. Because the two groups of antennas are overlaid, when the pen is moved, it is regarded that the two slip resistances move simultaneously in the same or reverse directions. The different positions that the Y axis directional resistance moves to are denoted as different coordinates on the Y axis, and the different positions that the X axis directional resistance moves to are denoted as different coordinates on the X axis. The plane coordinates of the pen can be calculated according to the X and Y coordinates, consequentially the position of the pen can be determined.

Moreover, the electromagnetic pen transmits electromagnetic signal continuously. When the pen-point touches the induction generation device, the electromagnetic signal passes through a certain location of the induction antenna, and then the antenna at this location induces the signal. The location signal induced by the induction generation device is transferred to the input terminal of the control identification circuit through the wires along X,Y axes. After array selecting, control process, band-pass filtering, detection rectification and A/D conversion, the resultant location signal is transferred to the processing circuit and calculated by the CPU so as to determine the location coordinates of the electromagnetic signal on the induction antenna and various operation statuses. Above data or information is sent to a computer, thereby to control the computer to identify, display, record and so on.

Furthermore, in order to obtain the pressure of pen-point in writing and to improve the induction accuracy of the location signal, a Z-axis directional pressure sensor is provided in the tail of the pen-point, and the output of the sensor is connected to the control terminal of the electromagnetic wave generation device, so the transmitted electromagnetic wave signal can be changed by means of pressure-touching, thereby the pressure (input signal) of the pen-point can be identified more exactly.

The output data induced and acquired by the whiteboard according to the present invention are identified data, which are transformed into the data of the motion track of the pen. Otherwise, the output data are unidentified data, i.e., coordinates data of the pen at respective time points.

Embodiment 2

Figure 11:
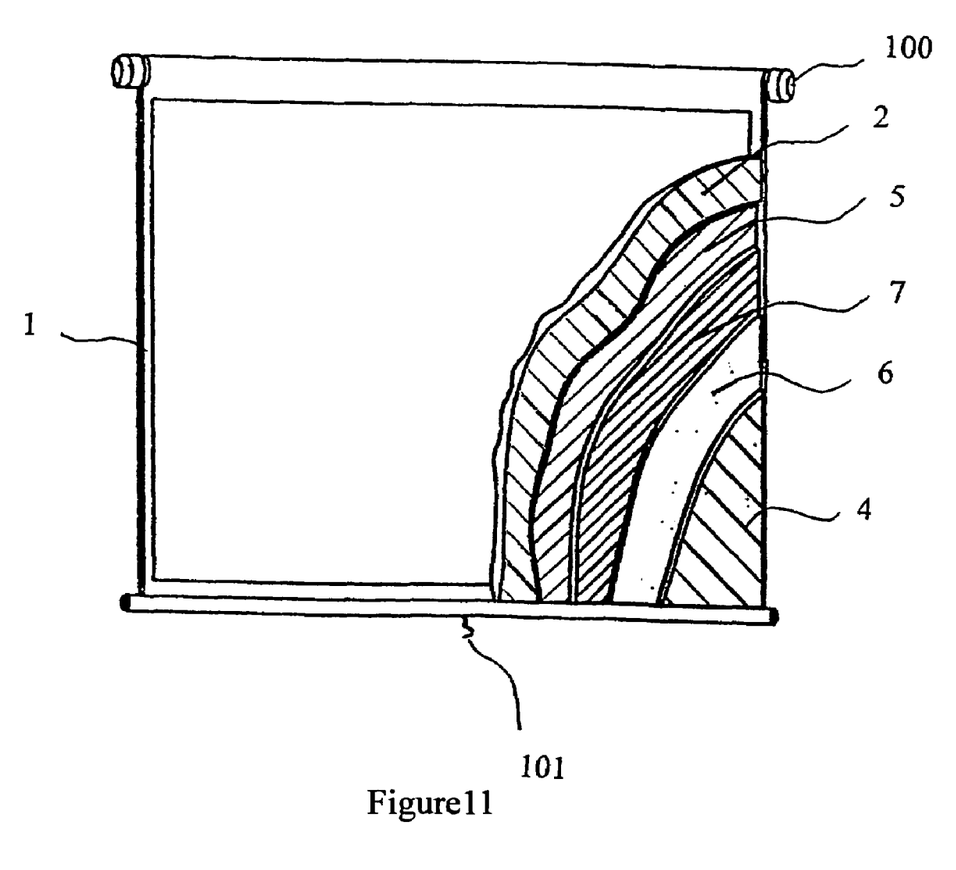
FIG. 11 is a structural diagram showing the spatial structure of embodiment two according to the present invention.

As shown in FIG. 11, a portable electronic whiteboard with a built-in electromagnetic induction layer of wire lattice according to the present invention includes: a writing input portion, a covering frame formed around the periphery of the electronic whiteboard, and a control circuit; wherein the writing input portion has multiple layers and is enclosed in the frame 1. The writing input portion includes a surface writing layer 2, an underlayer 4, and an input induction layer 5 provided between the writing layer 2 and the underlayer 4 and connected to the control circuit by its output. The writing input portion and the protecting frame 1 around the writing input portion is made of flexible and windable material.

As shown in FIG. 11, one side of the body is set into a spool 100 and fixed. Wring-springs for winding up the body are mounted on both ends of the spool. A positioning fastener 101 is provided on the other side of the body.

As shown in FIG. 11, the surface writing layer 2, the induction layer 5, the buffering layer 7, the shielding layer 6 and the underlayer 4 of the electronic whiteboard are all made of windable and flexible material for convenient carrying, hanging and storing. One side of the body is set into the spool 100 and fixed. Wring-springs for winding up the body are mounted on both ends of the spool. A positioning fastener 101 is provided on the other side of the body, which is used for fixing of the electronic whiteboard as it has completely wound up. The spool, the wring-spring and the related mechanism are similar to those of the existing projection curtain, existing winding window curtain and so on. Herein the unnecessary details will not be described. The electronic whiteboard that can be furled has the following advantages: convenience of carrying, storage and usage, and saving space.

The control circuit can be provided in the spool 100, in order to give a beautiful, integrated appearance.

Other technical features of the present embodiment are same as the embodiment 1, the detailed description about them can be referred to the corresponding contents of embodiment one, so it is omitted herein.

Above embodiments are used only to explain the present invention, but not to limit the present invention. In despite of the detailed description of the present invention with referring to above preferred embodiments, it should be understood that various modifications, changes or equivalents can be made by those skilled in the art without departing from the spirit and scope of the present invention. All of the modifications, changes or equivalents should be covered in the accompanying claims of the application.

What is claimed is:

1. An electronic whiteboard comprising:
  a writing input portion having a surface writing layer, an under layer, an input induction layer disposed between said surface writing layer and said under layer, and an output;
  a control circuit connected to said output of said writing input portion; and
  a covering frame formed around peripheries of said writing input portion;
  wherein said input induction layer has a plurality of electromagnetic induction layers overlaid one another and position reference columns provided around said electromagnetic induction layers, and each electromagnetic induction layer has a wire lattice comprising:
    first wires winded on said wire lattice, each of said first wires being winded around said position reference columns with multiple turns to form a plurality of loops with a plurality of latitudes substantially uniformly distributed across said wire lattice;
    second wires interlaced with said first wires, each of said second wires being winded around said position reference columns with multiple turns to form a plurality of loops with a plurality of longitudes substantially uniformly distributed across said wire lattice; and
    a plurality of induction cells each induction cell being a space surrounded by two adjacent longitudes and two adjacent latitudes;
  and wherein said first wires and second wires are enameled wires that are entirely covered or coated by an insulating layer and are insulated from each other, the induction cells of one electromagnetic induction layer overlay and interlace with the induction cells of another electromagnetic induction layer, and the size of each induction cell on one electromagnetic induction layer is different from the size of each induction cell on another electromagnetic induction layer.

2. The electronic whiteboard according to claim 1, wherein said input induction layer covers an area which is the same as or smaller than the areas covered by said surface writing layer and said underlayer.

3. The electronic whiteboard according to claim 2, wherein said input induction layer is positioned at one side or in the center of a writing area of said writing input portion.

4. The electronic whiteboard according to claim 1, wherein a shielding layer is provided behind said input induction.

5. The electronic whiteboard according to claim 4, wherein a buffering layer is provided between said input induction layer and said underlayer, or between said input induction layer and said shielding layer.

6. The electronic whiteboard according to claim 1, wherein said wire lattice is attached and fixed on an insulating membrane.

7. The electronic whiteboard according to claim 6, wherein said insulating membrane is made of film material.

8. The electronic whiteboard according to claim 1, wherein said control circuit includes circuits for signal amplification, filtering acquisition and data processing, and is provided with a signal output device and/or a storing device; said signal output device comprises an electrical cable with standard computer data interface or wireless data switching means; said signal output device connects with a computer and/or a printer, or an external data storing device, or connects with a telephone line by an auxiliary modem.

9. The electronic whiteboard according to claim 1, wherein said control circuit and said input induction layer are directly connected, components of said control circuit are positioned on an output end of said wire lattice, and said control circuit is formed in a body of the electronic whiteboard.

10. The electronic whiteboard according to claim 1, wherein components of said control circuit are provided on a printed circuit board which is separated from said input induction layer; an output end of said wire lattice of said input induction layer is connected to a corresponding input terminal on the printed circuit board by means of pressure-connection, plug-in connection or welding connection.

11. The electronic whiteboard according to claim 10, wherein said output end of said wire lattice of said input induction layer is formed between a hard pressing strip and the printed circuit board; a buffering layer is provided between the hard pressing strip and said output end of said wire lattice; and the hard pressing strip, the buffering layer and said output end of said wire lattice are overlaid on the printed circuit board by means of screwing-conjunction; said output end of said wire lattice is connected to a corresponding input terminal on the printed circuit board.

12. The electronic whiteboard according to claim 10, wherein the control circuit is installed outside a body of said electronic whiteboard, and connected to the body through an electrical connection means, said output end of said wire lattice of said input induction layer is connected with an output interface of said input induction layer by means of pressure-connection, plug-in connection or welding-connection, and an interface matching said output interface of the induction layer is provided on the control circuit.

13. The electronic whiteboard according to claim 12, wherein said output interface of said input induction layer and the interface of the control circuit is a pin-type connection means, or a flexible printed wiring means, or a PIN-PIN connection means, or a welding spot (VGA) thermal-melted connection means, or an ultrasonic welding device, or a solder-plate welding device, or a puncturing connection means.

14. The electronic whiteboard according to claim 1, wherein said writing input portion and said covering frame around said writing input portion are made of flexible and windable material, and the electronic whiteboard is windable and portable.

\* \* \* \* \*

UNITED STATES PATENT AND TRADEMARK OFFICE
CERTIFICATE OF CORRECTION

PATENT NO. : 7,679,607 B2  Page 1 of 1
APPLICATION NO. : 10/527849
DATED : March 16, 2010
INVENTOR(S) : Xuanming Shi It is certified that error appears in the above-identified patent and that said Letters Patent is hereby corrected as shown below:

Title Page Item (73), Assignee: change "Tai Guen Enterprises Co., Ltd., Taoyuan Hsien (TW)" to --Tai Guen Technology (Shen-Zhen) Co., Ltd., Shenzhen City, (CN)--

Signed and Sealed this

Sixteenth Day of November, 2010

David J. Kappos
*Director of the United States Patent and Trademark Office*